April 30, 1929.     J. B. ARMITAGE     1,710,913
MACHINE TOOL ORGANIZATION
Filed July 29, 1925     2 Sheets-Sheet 2
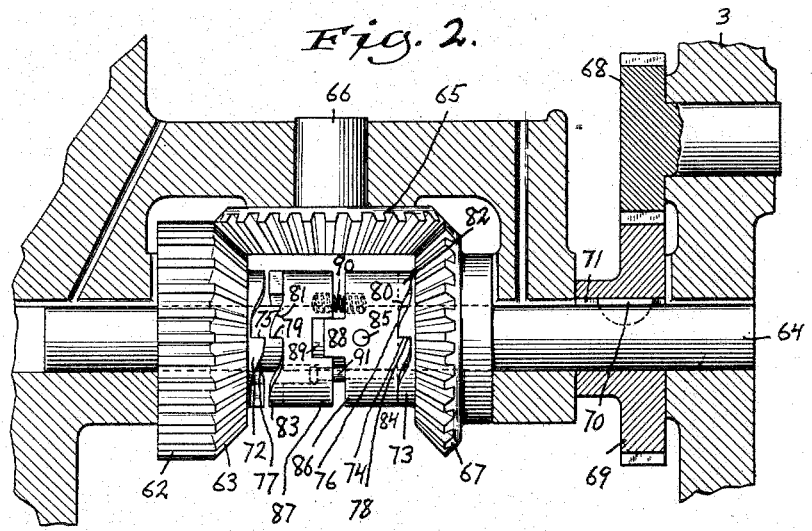
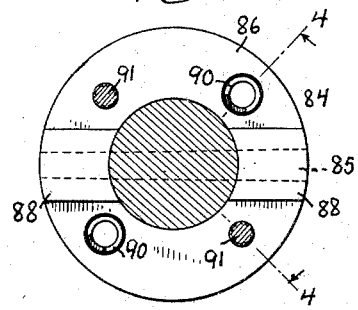
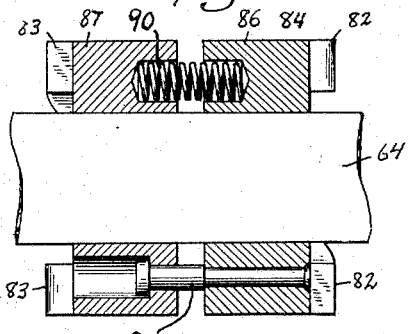
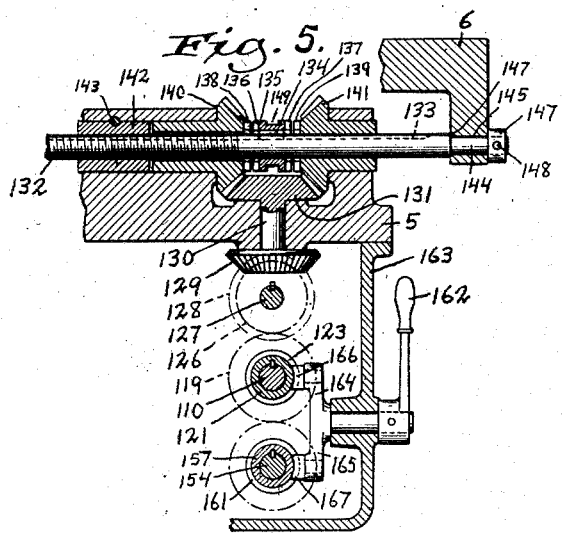
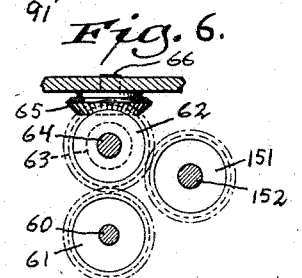
INVENTOR.
Joseph B Armitage
BY Fred G Parsons
ATTORNEY.

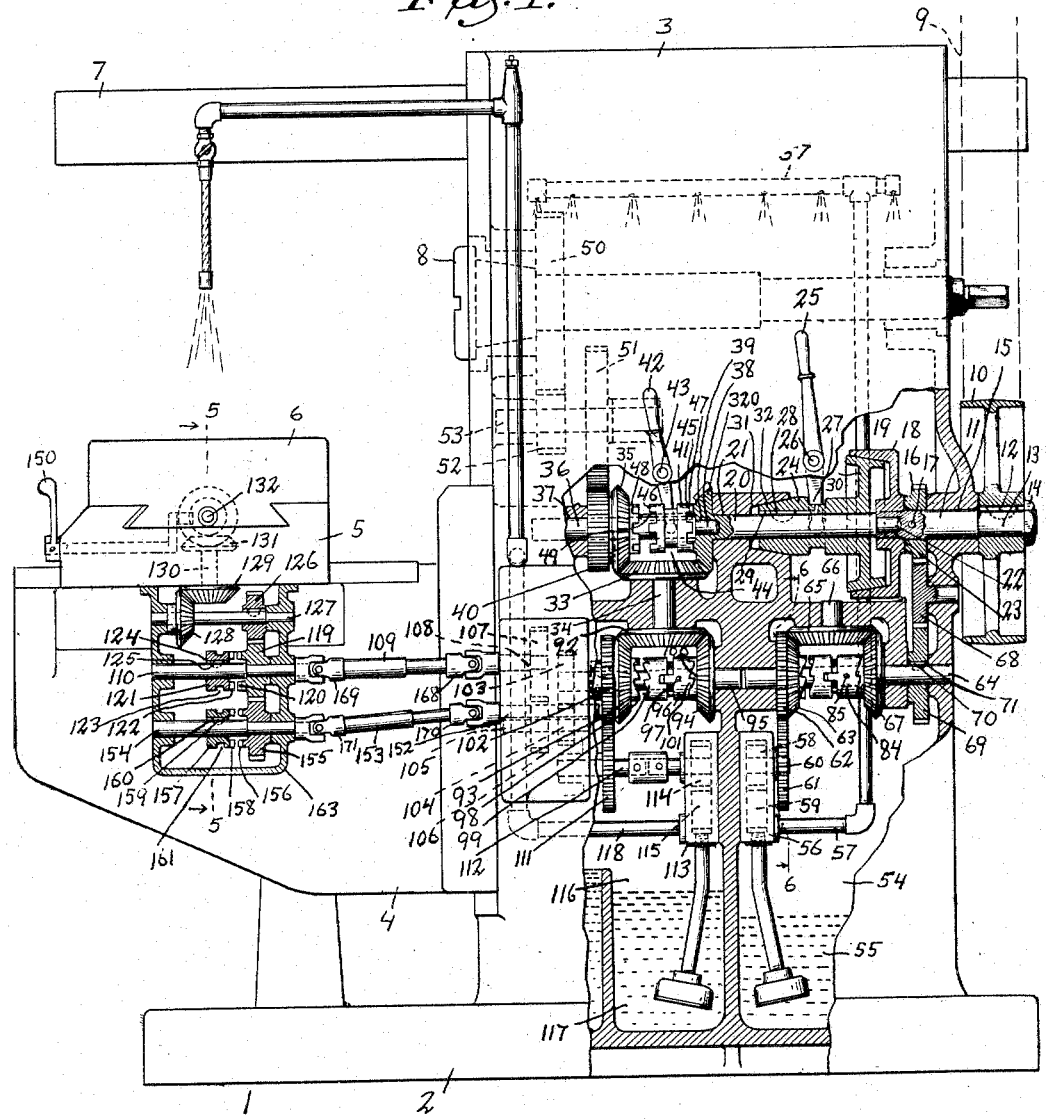

Patented Apr. 30, 1929.

1,710,913

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

MACHINE-TOOL ORGANIZATION.

Application filed July 29, 1925. Serial No. 46,787.

This invention relates to machine tool organization, and the object of the invention is to improve the construction and operation of machine tool organization in the manner to be hereinafter described and claimed.

Referring to the drawings, which accompany this specification and form a part hereof, which drawings illustrate an embodiment of this invention, and on which drawings the same reference characters are used to designate the same parts wherever they may appear in each of the several views, Fig. 1 is an elevation of a milling machine, a part being broken away, and parts being shown in section; Fig. 2 is an elevation of parts, parts being shown in section; Fig. 3 is an end elevation of a part, some other parts being shown in section; Fig. 4 is a section taken on the line 4—4 on Fig. 3, looking in the direction indicated by the arrows; Fig. 5 is a section taken on the line 5—5 on Fig. 1, looking in the direction indicated by the arrows; and Fig. 6 is a section taken on the line 6—6 on Fig. 1, looking in the direction indicated by the arrows.

It is frequently desirable that, in designing machine tools, the organization, construction, and principle of operation of one or more parts be such that the direction of rotation or rotations shall be the same whether the main drive rotates a driven member in one direction or the other. A milling machine, for example, may be designed and constructed so that its main drive rotates clockwise. If such a machine were to be placed in a machine shop in a position with respect to a line shaft, for example, so that a belt would not run the milling machine in the single direction in which it was designed to be run, the milling machine would have to be run with a crossed belt in order to obtain the proper direction of drive for the milling machine as designed. The crossing of a belt creates a nuisance and there may be installations where the distances between shafts are too short for running crossed belts. A machine might also, by reason of carelessness, be set up so that it, or parts of it, might be broken by running the machine in the wrong direction.

It is an object of this invention to provide a machine in which parts cannot be run in a wrong direction.

Referring to the drawings, the reference numeral 1 designates a milling machine generally. The reference numeral 2 designates a base, 3 a column, 4 a vertically movable knee, 5 a saddle slidable upon the knee 4, and 6 a table slidable upon the saddle 5. The column 3 is illustrated as provided with an overarm 7 and with a spindle 8. The constructions so far described are well known, and do not require any further description in this specification, although it will be understood that this invention is not limited to a milling machine nor to any specific construction of milling machine. Movable parts of the machine are illustrated as driven by a belt 9 through a main drive belt pulley 10 which is illustrated as keyed to a shaft 11 by a key 12. The shaft 11 is provided with a reduced part 13 upon which the driving pulley 10 is seated and upon which it is retained by the nut 14 screwed onto the outer screwthreaded end of the shaft. The shaft 11 can rotate in a bearing 15 and is prevented from endwise movement by the driving pulley 10 and by a gear 16 which is secured by a pin 17, for example, to the shaft. The shaft 11 has secured to its inner end one member 18 of a friction clutch 19. A shaft 20 is supported near one end in a bearing 21 and its other end is provided with a reduced cylindrical part 22 which is supported in a bearing 23 formed in the inner end of the shaft 11 so that the shaft 11 can rotate without rotating the shaft 20. A combined clutch and brake member 24 is supported by the shaft 20 and is movable longitudinally thereof by means of the shipping lever 25 which is pivoted to the column 3 by the pivot 26. The shipping lever 25 engages with a circumferential groove 27 in the combined clutch and brake member 24 in an ordinary manner, and the combined clutch and brake member 24 and the shaft 20 are compelled to rotate together by a key 28, a part of which is seated in the shaft 20 and the other part of which extends into a longitudinal keyway 29 in the combined clutch and brake member 24. The combined clutch and brake member 24 is provided with a member 30 of the friction clutch 19 to coact with the member 18 of this friction clutch, the two members being provided with coacting coned parts, as will be readily understood from an inspection of Fig. 1 of the drawings. An internally coned part 31 is formed adjacent the bearing 21, and the combined clutch and brake member 24 is provided with an externally coned part 32 to coact with the part 31 to constitute a brake for stopping the movements of parts when the two members of the friction clutch 19 are disengaged by the shipping lever 25. The shaft 20 has a bevel gear 320 rigidly secured thereto so as to rotate therewith, this point being accentuated by Fig. 1 of the drawings showing the bevel gear 320 as an integral part of the shaft 20. The bevel gear 320 meshes with a bevel gear 33 which is rigidly secured to a shaft 34. A bevel gear 35 is always meshed with the bevel gear 33, the same as the bevel gear 320, so that these three bevel gears 320, 33, and 35 must always rotate together, as will be readily understood from an inspection of Fig. 1 of the drawings. A shaft 36 is supported in a bearing 37 at one end and has a reduced cylindrical part 38 which fits in a cylindrical bearing 39 in the end of the shaft 20. The bevel gear 35 is loose upon the shaft 36 while the gear 40 is secured to the shaft 36 so as to rotate therewith and the clutch member 41 is also secured to the shaft 36 so as to rotate therewith while being longitudinally movable thereon by means of the shipping lever 42 which is pivoted on the pivot 43. Fig. 1 of the drawings illustrates the clutch member 41 as provided with a circumferential groove 44 for the shipping lever 42, this construction being common and the same as the construction for the shipping lever 25 and the circumferential groove 27 of the combined clutch and brake member 24. The clutch member 41 and the bevel gears 320 and 33 are illustrated as provided with clutch teeth which, when they coact or engage, will not become disengaged except by moving the clutch member 41 by the shipping lever 42. The clutch member 41 is provided with two sets of clutch teeth which are designated by the reference numerals 45 and 46, and the bevel gears 320 and 35 are provided with clutch teeth 47 and 48 and it will be readily apparent from an inspection of Fig. 1 of the drawings that, when the clutch teeth 45 and 47 are intermeshed and coacting, the shaft 36 can be rotated directly by the shaft 20 and in the same direction of rotation with the shaft 20, while, if the clutch teeth 46 and 48 be engaged or coacting, the shaft 36 can be rotated by the shaft 20, but the direction of rotation of the shaft 36 will be opposite to the direction of rotation of the shaft 20. This action results from the shaft 20 being a drive shaft with the bevel gear 320 rigidly fixed therewith so that the shaft 36 will be driven by the shaft 20 when the clutch teeth 45 of the clutch member 41 are engaged with the clutch teeth 47 of the bevel gear 320. If, however, the clutch member 41 be moved so that its clutch teeth 46 engage the clutch teeth 48 of the bevel gear 35 which is loose on the shaft 36, the shaft 36 will be driven from the shaft 20 through the bevel gear 320, the bevel gear 33, the bevel gear 35, the clutch member 41, and the key 49 which secures the clutch member 41 to the shaft 36, to compel rotation of the clutch member 41 and the shaft 36 together while permitting the clutch member 41 to be moved longitudinally on the shaft 36. The total length of the clutch member 41 and its clutch teeth 45 and 46 is less than the distance between the clutch teeth 47 on the bevel gear 320 and the clutch teeth 48 on the bevel gear 35, so that the clutch member 41 can be moved by the shipping lever 42 into positions to engage either the clutch teeth of the bevel gear 320 or the clutch teeth of the bevel gear 35 or to occupy a neutral position without engaging the clutch teeth of either of said bevel gears. The gear 40 drives the spindle 8 and the tool arbor and tool or tools, not shown, by means of a gear 50, which is rigidly secured to the spindle 8, and gears 51 and 52 which are illustrated by the drawings as rigidly secured to a shaft 53.

The operation of the mechanism as thus far described will be readily apparent from an inspection of Fig. 1 of the drawings. Assuming that the belt pulley 10 is being rotated in either of its two possible directions of rotation, and assuming that the members 18 and 30 of the friction clutch 19 are engaged and coacting, the shaft 36 will be rotated if the clutch teeth on the clutch member 41 are engaged with either the clutch teeth 47 on the bevel gear 320 or with the clutch teeth 48 on the bevel gear 35. It will also be readily apparent, on account of the relationship of the bevel gears 320, 33, and 35, the bevel gear 35 being loose on the shaft 36, that the direction of rotation of the shaft 36 will depend solely upon the position of the clutch member 41, and that the direction of rotation of the spindle 8 will be solely dependent upon the position of the clutch member 41. This construction, therefore, provides for the spindle 8 being rotated in either direction no matter what may be the direction of rotation of the pulley 10, the shaft 11, and the shaft 20. In other words, the operator of the machine always has under his control the direct or the reverse motion of the tool, not shown, driven by the spindle 8. The words "direct" and "reverse" may be referred to a direction of movement of the table 6, to make their meanings clearer. It is preferred that the direction of rotation of the spindle 8 of a milling machine shall be left entirely to the control of an operator instead of being either not subject to his control or only partially subject to his control, but there are other parts of the mechanism which it is desirable shall not be subject to the operator's control at all, while there are other parts of mechanism which it is desirable to have automatically operated in a predetermined manner, in whatever direction the main drive may rotate, but which are also under the control of the operator, as will now be described.

The reference numeral 54 designates a reservoir for lubricant. The lubricant 55 is pumped from the reservoir 54 by a unidirectional pump 56, such as a gear pump, and is distributed by conduit connections 57 and returns to the reservoir 54 by gravity. The unidirectional pump 56 may be of any suitable or preferred construction, but Fig. 1 of the drawings illustrates a pump of the intermeshing gear type provided with two gears 58 and 59 which rotate together but in opposite directions of rotation, the gear 58 being rigid with a shaft 60 to which a gear 61 is also rigidly connected. The gear 61 meshes with a gear 62 which may be formed integrally with the bevel gear 63, the point being to have the gear 62 and the bevel gear 63 connected together and both loose on the shaft 64. The bevel gear 63 is always in mesh with a bevel gear 65 which is rotatable on a stud 66, and the bevel gear 65 is always in mesh with a bevel gear 67 which is also loose upon the shaft 64. The shaft 64 is rotated by the gear 16 by means of the gears 68 and 69. The gear 69 is fixed to the shaft 64 so as to produce rotation of the shaft 64 while permitting longitudinal movement of the shaft 64 with respect thereto. Fig. 1 of the drawings illustrates a key 70 seated in the shaft 64 and extending into a keyway 71 in the gear 69. The bevel gears 63 and 67 are provided with clutch teeth 72 and 73 which face in opposite directions and have drive faces 74 and 75 and disengaging faces 76 and 77 to coact with drive faces 78 and 79 and disengaging faces 80 and 81 of clutch teeth 82 and 83 on a clutch member 84 which is secured to the shaft 64 in any suitable manner as, for example, by a pin 85 extending through the clutch member 84 and the shaft 64. The clutch member 84 is illustrated by the drawings as composed of two parts 86 and 87. The part 86 is illustrated as secured to the shaft 64 by the pin 85 and is provided with drive lugs 88 which engage in recesses 89 in the part 87. The parts 86 and 87 are resiliently separated by springs 90 and the permissible limit of separation of the parts is determined by bolts 91. The reason for the resilient connection of the parts is to permit the clutch teeth of the clutch member 84 to properly engage the clutch teeth on a bevel gear 63 or 67 when the clutch member 84 is moved with the shaft 64 to disengage the clutch member from one bevel gear and to engage with the other bevel gear in the manner to be presently described, as the points of clutch teeth on the clutch member 84 might be brought into contact with the points of clutch teeth on a bevel gear during the movement of parts. Should the points of the clutch teeth contact, the springs 90 will yield until the clutch teeth are brought into positions for proper engagement, when the springs 90 will cause the proper engagement of the clutch teeth.

Assuming, for example, that the belt 9 is intended to rotate the belt pulley 10 in a clockwise direction but that, for some reason, the belt pulley 10, or the main drive is rotated in a counterclockwise direction, these directions being determined by a person facing the machine and the pulley 10. The shaft 11 and the gear 16 will be rotated counterclockwise; the gear 68 will be rotated clockwise; the gear 69, the shaft 64, and the clutch member 84 will be driven counterclockwise. The mechanism of the pump 56 offers enough resistance, combined with other frictional resistance, to prevent the pump mechanism being driven when the disengaging faces 80 of the clutch teeth 82 of the clutch member 84 are attempting to drive the bevel gear 67 by engaging the disengaging faces 76 of the clutch teeth 73 on the bevel gear 67. The drive onto the bevel gears 63 and 67 is always through the shaft 64 and the clutch member 84, and, looking at Fig. 2 of the drawings, it will be readily seen that, if the shaft 64 and the clutch member 84 are rotated in a counterclockwise direction, the clutch member 84 and the shaft 64 will be moved bodily towards the left hand with the result that the clutch teeth 83 on the clutch member 84 will engage the clutch teeth 72 on the bevel gear 63 and rotate the bevel gear 63 counterclockwise. If the clutch member 84 were driving the bevel gear 67 in a clockwise direction, the direction of rotation of the bevel gear 63 would be in a counterclockwise direction on account of the presence of the bevel gear 65. It will thus be apparent that the gear 61 and the pump gears 58 and 59 will always be driven in the same direction regardless of the direction of rotation of the shaft 64, and that no attention need be given to the lubricant pump and its driving connections to prevent damage or inoperativeness in case of a reversal of the direction of rotation of the main drive, or belt pulley 10 and shaft 11.

A bevel gear 92 is fixed to the shaft 34 and is at all times engaged with bevel gears 93 and 94 which are loosely mounted upon a shaft 95. A clutch member 96 is secured to the shaft 95 by a pin 97 and this clutch member 96, as illustrated by the drawings, is of the same construction in all respects, with the exception of the facing of the clutch teeth on its ends, as the clutch member 84 already described. It will be noted that the clutch teeth of the clutch member 84 face in opposite directions while the clutch teeth of the clutch member 96 face in the same direction. The reason for this difference in construction is due to the fact that the clutch member 84 is the driving member while the clutch member 96 is a driven member. The clutch teeth on the bevel gear 93 are designated by the reference numeral 98 while the coacting clutch teeth on the clutch member 96 are designated by the reference numeral 99; and the clutch teeth on the bevel gear 94 are designated by the reference numeral 100 while the coacting clutch teeth on the clutch member 96 are designated by the reference numeral 101. These several clutch teeth have drive faces and disengaging faces of the same construction and for the same purpose as the corresponding clutch teeth of the clutch member 84 and the bevel gears associated therewith, with the exception as to the direction of facing of the clutch teeth as hereinbefore noted, and does not require any further description here. The shaft 95 is endwise movable and has rigidly secured thereto a gear 102 and a gear 103. The gear 103 is shown by Fig. 1 of the drawings as driving a gear 104, a shaft 105, gear 106, gear 107, which are change speed gears, shaft 108, universally jointed and telescopically constructed shaft 109, and shaft 110.

The gear 102 meshes with a gear 111 which is secured to a shaft 112. The shaft 112 operates a nonreversible pump 113, which is illustrated by Fig. 1 of the drawings as a gear type of pump which is of the same type of construction as the pump 56 heretofore described and which has a gear 114 secured to the shaft 112 and a gear 115 meshing with the gear 114. The reference numeral 116 designates a reservoir for a lubricant or cooling liquid for a cutting tool, not shown, and this liquid 117 is pumped by the pump 113 through suitable conduits 118 to the place of use.

Fig. 1 of the drawings shows the parts in positions to be driven by a clockwise rotation of the belt pulley 10 and the shaft 11 and, assuming that the belt pulley 10 is being rotated, the bevel gear 92 is rotating the bevel gear 94 to rotate the shaft 95 in a counterclockwise direction. If, for any reason, the main drive is counter-clockwise, the clutch member 96 and shaft 95 will be moved towards the left and the clutch teeth 99 on the clutch member 96 will engage the clutch teeth 98 on the bevel gear 93 and the shaft 95 will still be rotated in a counterclockwise direction and the direction of rotation of the gears and shafts driven from the shaft 95 will not be affected by any change in the direction of rotation of the pulley 10 or shaft 11.

The shaft 110 transmits different velocities of movement to the table 6 in accordance with the positions of the gears of the speed change mechanism. The particular speed for the movement of the table 6 is selected, within the range of adjustment of the speed change gears, according to the metal being worked and according to the thickness of the cut being taken, but it is desirable to return the table at a higher speed than any speed used for a cutting operation and the mechanism for returning the table at this higher speed will be specifically described hereafter. A gear 119 is loosely mounted upon the shaft 110 and is provided with clutch teeth 120. A clutch member 121 is mounted on the shaft 110 so as to be rotated thereby but being free to be moved longitudinally thereof. The clutch member 121 is provided with clutch teeth 122 and is provided with a groove 123 for a clutch shifter, and is provided with a key-way 124 into which projects a key 125 which is set into the shaft 110. It will be readily seen from an inspection of Fig. 1 of the drawings that the gear 119 can be clutched to the shaft 110 or unclutched therefrom by the proper movement of the clutch member 121. The gear 119 meshes with a gear 126, which is fast upon a shaft 127 and upon which shaft a bevel gear 128 is also fast. The bevel gear 128 meshes with a bevel gear 129 which is fast to a shaft 130 to which another bevel gear 131 is also fast. The reference numeral 132 designates the feed screw for the table 6. This feed screw 132 is provided with a longitudinal groove 133 to receive a spline 134 on a clutch member 135. The clutch member 135 is provided with clutch teeth 136 and 137 at opposite ends to engage respectively with clutch teeth 138 and 139 on bevel gears 140 and 141 through which the feed screw 132 passes freely. These bevel gears 140 and 141 are constantly in mesh with the bevel gear 131 and are suitably supported by the saddle 5 for rotation and constant engagement with the bevel gears 140 and 141. The screwthreaded part of the feed screw 132 passes through a screwthreaded nut 142 which is secured to the saddle 5 by a pin 143, for example, to hold it fixed against rotation. The feed screw 132 is illustrated by Fig. 5 of the drawings as provided with a reduced part 144 which is rotatable in a bearing 145 in the table 6 and is provided with a shoulder 147 to move the table in one direction while a collar 147 secured to the feed screw by a pin 148 moves the table in the opposite direction. The clutch member 135 is provided with a circumferential groove 149 for a shipping lever 150 and the length of the clutch member 135, including the clutch teeth thereon, is less than the distance between the clutch teeth on the bevel gears 140 and 141, so that the operator can move the clutch member 135 to clutch the feed screw 132 to either the bevel gear 140 or to the bevel gear 141 or move it to an intermediate or neutral position in which the clutch member is not engaged with either of said bevel gears. The construction and operation of the feed screw 132 and its immediately associated mechanisms just described is an ordinary and well-known construction on milling machines, for example, and will be readily understood, but it should be observed that the presence of the automatically acting clutch member 96 has retained and preserved for the operator of the machine the customary right and left movements of the shipping lever 150 for the feeding movement of the table 6 and its return movement no matter in what direction the main drive, the shaft 11 for example, may be rotated, so that the operator is not disturbed and continues to control the movements of the table 6 in precisely the same manner to which he has become accustomed and his efficiency as a milling machine operator is not impaired by the direction of rotation of the main drive of the milling machine as a unit.

It is very desirable in the operations of certain classes of machines to provide for a return or non-working movement to be much faster than a working movement in order to eliminate what may properly be termed idle time of the machine and idle time of the operator or operators of the machine. Such a quick movement of the table 6 can be easily accomplished with my invention, without changing ordinary and well-known movements of the operator in controlling a machine, by taking a drive from some part of the machine the direction of motion of which is not changed by a change of direction of motion of the main drive. As heretofore explained, the direction of rotation of the gear 62 is not changed by a change in the direction of rotation of the main drive or the shaft 11 and the reference numeral 151 (see Fig. 6 of the drawings) designates a gear which meshes with the gear 62. This gear 151 is not seen in Fig. 1 of the drawing for the reason that it happens to be placed in front of the gear 62 and is eliminated by the sectional showing of Fig. 1 of the drawings, but its location is plainly shown by Fig. 6 of the drawings. The gear 151 is fast on a shaft 152 and the shaft 152 is connected through universal joint connections and the telescopically slidable shaft 153 with a shaft 154 on which is loosely supported a gear 155 which meshes with gear 119. The gear 155 is provided with clutch teeth 156 and a clutch member 157, which is provided with clutch teeth 158, is compelled to rotate with the shaft 154, while being longitudinally movable with respect thereto, by a key 159 which is set into the shaft 154 and extends into a keyway 160 in the clutch member 157. The clutch member 157 is provided with a circumferential groove 161 for a clutch shifter and a clutch shifter or shipping lever 162 is mounted on the gear box 163 and is provided with oppositely extending arms 164 and 165 which are provided with projections 166 and 167 to enter the circumferential grooves 123 and 161, respectively, of the clutch members 121 and 157. It will be understood that the gear box 163 is attached to the saddle 5 and that the telescopic shaft 109 and 153, with their universal joint connections 168, 169, 170, and 171, with the shafts to which they are connected, permit movement of the saddle 5 towards and away from the column 3, and the vertical movements of the knee 4, while retaining operative drive connections between the parts, it being understood, of course, that the parts of the shafts 109 and 153, while being telescopically slidable, are restrained from independent rotational movement in any ordinary or well-known manner.

It will be readily understood, from an inspection of Figs. 1, 5, and 6 of the drawings and the foregoing description, that the operator can manipulate the clutch shifter or shipping lever 162 to either engage the clutch member 121 with the gear 119, or engage the clutch member 157 with the gear 155, or disengage both of said clutch members from both of said gears by proper movements of the clutch shifter or shipping lever 162 and that the movement of the clutch shifter or shipping lever 162, to effect the desired results, is not dependent upon the direction of rotation of the main drive or shaft 11. It is also obvious that the clutch members 121 and 157 cannot both be engaged with a gear at the same time.

What I claim is:

1. The combination in a machine tool, of a main drive capable of being rotated in either direction of rotation, a spindle drive train including a reverser connected for actuation from said main drive, a part intended to be rotated in only one direction of rotation, a drive train for said part and connected to be driven between said main drive and said reverser, and means associated with the last named train to automatically maintain the single direction of rotation of said part regardless of the direction of rotation of the said main drive and spindle.

2. The combination in a machine tool, of a main drive capable of being rotated in either direction of rotation, a rotatable part intended to be selectively operated in either direction of rotation, a drive train connecting said main drive and said part and including a selectively operable reverser, another rotatable part, a drive train for said last mentioned part and connected to be driven at a point between said main drive and said reverser, and automatic reversing means in the last mentioned train.

3. The combination in a machine tool, of a driver capable of being rotated in either direction of rotation, a part intended to be rotated in only one direction of rotation, means interposed between said driver and said part to automatically maintain the single direction of rotation of said part regardless of the direction of rotation of the said driver, a second part intended to be rotated in either direction of rotation and rotated by said first mentioned part, and a power train connecting said parts and including a selectively operable reverser.

4. The combination in a machine tool having a rotatable spindle, of a drive train therefor including a driver capable of being rotated in either direction of rotation, clutch means in said train for connecting or disconnecting said driver and spindle, a rotatable part intended to be rotated in only one direction of rotation, and a drive train connecting said part with the other drive train at a point between said driver and clutch means and including means to automatically maintain the single direction of rotation of said part regardless of the direction of rotation of the said driver.

5. The combination in a machine tool, of a driver capable of being rotated in either direction of rotation, a table, rotatable means for imparting movements to said table, a drive train connecting said driver and said rotatable means including a plurality of reversers, one of which is arranged to receive and transmit power derived through the other, and means associated with said other reverser for operation thereof whenever the direction of rotation of said driver is changed.

6. The combination in a machine tool, of a main drive shaft capable of being rotated in either direction of rotation, a pump having a rotatable part intended to be rotated in only one direction of rotation, a table, a reverser connected for operation of said table, a rotatable element connected for operation both of said reverser and said pump, and means, interposed between said main drive shaft and said element, and adapted to automatically maintain unidirectional rotations of said element regardless of the direction of rotation of the main drive shaft.

7. The combination in a machine tool, of a main drive shaft capable of being rotated in either direction of rotation, a rotatable spindle, a spindle train connectible with said shaft and including a selectively operable reverser, a movable table, a table train connected with said spindle train at a point between said shaft and reverser and including a plurality of reversers, one of which is positioned in the train to receive power through the other, and means associated with said other reverser for operation thereof whenever the direction of rotation of said drive shaft is changed.

8. The combination in a machine tool, of a main drive shaft, a rotatable spindle, a movable table, means to rotate said spindle and to move said table from said main drive shaft, a lubricant pump having a rotatable part, an endwise movable shaft, two gears provided with clutch teeth facing in opposite directions mounted on said endwise movable shaft, means for rotating said endwise movable shaft from said main drive shaft, means for causing the gears on said endwise movable shaft to rotate in opposite directions, means for rotating the rotatable part of the pump from one of said gears, and a clutch member secured to said endwise movable shaft, and provided with driving faces and disengaging faces at each end, the clutch teeth on the two gears on the said endwise movable shaft also being provided with driving faces and disengaging faces.

9. The combination in a machine tool, of driving mechanism, driven mechanism, an endwise movable shaft, two gears loosely mounted on said endwise movable shaft and provided with clutch teeth having driving and disengaging faces, a clutch member on said endwise movable shaft and composed of two members one of which is movably secured to said endwise movable shaft while the other is compelled to rotate with said shaft but is yieldingly held a predetermined distance from said first mentioned part, said clutch member being provided with clutch teeth at both ends having driving faces and disengaging faces to coact respectively with one of said gears.

10. In a milling machine, the combination of a spindle, transmission mechanism therefor including a drive pulley capable of opposite directions of rotation and a clutch operable to connect or to disconnect said spindle from said pulley, a first pump and a driving train therefor connected to be driven from said transmission between said clutch and said pulley, a second pump and a driving train therefor connected to be driven from said transmission between said clutch and said spindle, drive members in each of said trains movable to alternative positions, and means for automatically moving each of said members when the direction of rotation of said pulley is altered.

In witness whereof I hereto affix my signature.

JOSEPH B. ARMITAGE.